United States Patent
Nelson et al.

(10) Patent No.: US 12,480,783 B2
(45) Date of Patent: Nov. 25, 2025

(54) METHOD AND SYSTEM TOOL FOR AIRCRAFT FACILITY ACCESS CAPTURE

(71) Applicants: John Robert-Winfred Nelson, Port Orange, FL (US); Levi D. Coblentz, New Smyrna Beach, FL (US)

(72) Inventors: John Robert-Winfred Nelson, Port Orange, FL (US); Levi D. Coblentz, New Smyrna Beach, FL (US)

(*) Notice: Subject to any disclaimer, the term of this patent is extended or adjusted under 35 U.S.C. 154(b) by 87 days.

(21) Appl. No.: 17/181,334

(22) Filed: Feb. 22, 2021

(65) Prior Publication Data

US 2021/0262826 A1    Aug. 26, 2021

Related U.S. Application Data

(60) Provisional application No. 62/995,997, filed on Feb. 24, 2020.

(51) Int. Cl.
| | | |
|---|---|---|
| *G01C 21/00* | (2006.01) | |
| *G06Q 30/0283* | (2023.01) | |
| *G07B 15/02* | (2011.01) | |
| *G07B 15/06* | (2011.01) | |
| *B64D 43/00* | (2006.01) | |

(52) U.S. Cl.
CPC ..... *G01C 21/3885* (2020.08); *G06Q 30/0284* (2013.01); *G07B 15/02* (2013.01); *G07B 15/063* (2013.01); *B64D 43/00* (2013.01); *G06Q 2240/00* (2013.01)

(58) Field of Classification Search
CPC ........... G01C 21/3885; G06Q 30/0284; G06Q 2240/00; G07B 15/02; G07B 15/063; B64D 43/00
See application file for complete search history.

(56) References Cited

U.S. PATENT DOCUMENTS

| | | | | |
|---|---|---|---|---|
| 2014/0167961 | A1* | 6/2014 | Finlow-Bates | ....... H04W 4/021 340/541 |
| 2016/0012735 | A1* | 1/2016 | Koukol | ..................... G01S 1/14 701/17 |
| 2017/0150308 | A1* | 5/2017 | Jones | ..................... H04W 68/00 |
| 2022/0187472 | A1* | 6/2022 | Cote | ..................... G06F 3/0482 |

OTHER PUBLICATIONS

Sahawneh, L., Duffield, M., Beard, R., and McLain, T. "Detect and Avoid for Small Unmanned Aircraft Systems using ADS-B", 2015. Air Traffic Control Quarterly, vol. 23, No. 2-3, pp. 203-240. (Year: 2015).*

Mott, J. H., Marshall, Z. A., Vandehey, M. A., May, M., & Bullock, D. M. (2020). "Detection of Conflicts Between ADS-B-Equipped Aircraft and Unmanned Aerial Systems". Transportation Research Record, 2674(1), 197-204. (Year: 2020).*

* cited by examiner

*Primary Examiner* — Jeff Zimmerman
*Assistant Examiner* — Wayne S. Murray
(74) *Attorney, Agent, or Firm* — The Law Office of John R. Nelson, PA; John R. Nelson, Esq.

(57) ABSTRACT

Method and system tool for capturing aircraft position information on the ground using ADS-B message data to provide location data and comparing the location data to stored boundary information content in real-time on a computer processor based system, using location data as a primary input.

12 Claims, 4 Drawing Sheets

AIRPORT DIAGRAM AND BOUNDARY

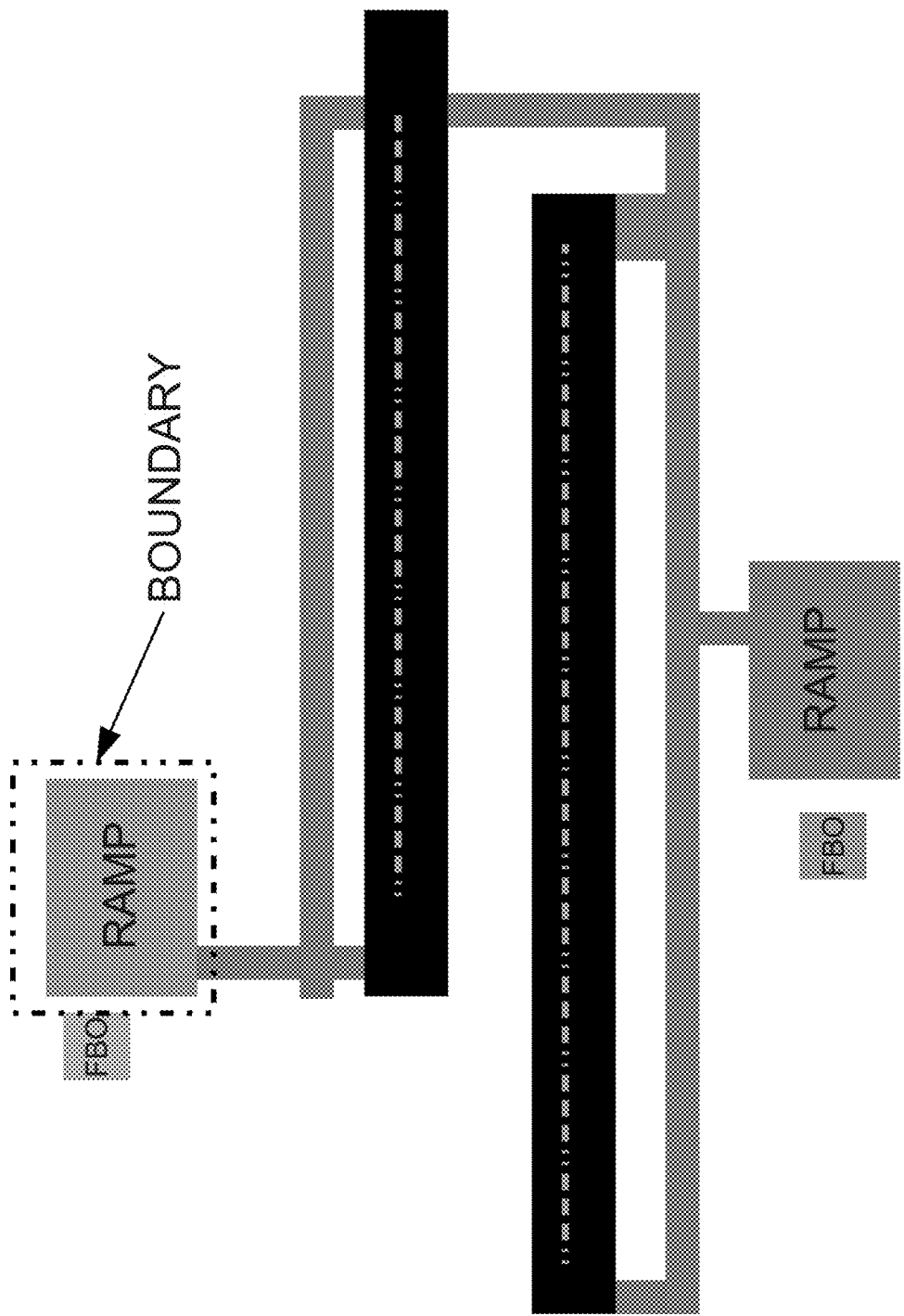
FIG.1 AIRPORT DIAGRAM AND BOUNDARY

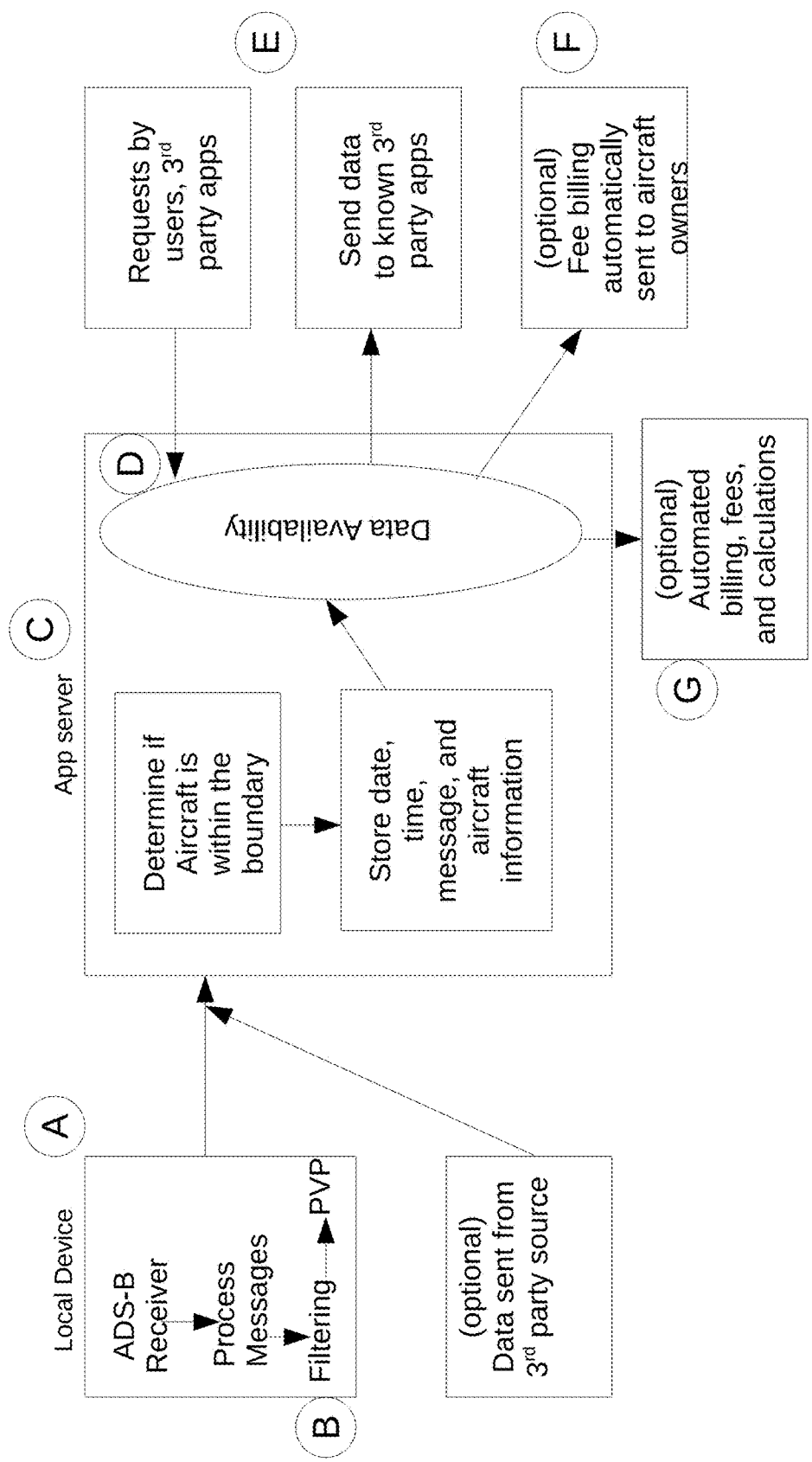
FIG. 2 APPLICATION OVERVIEW

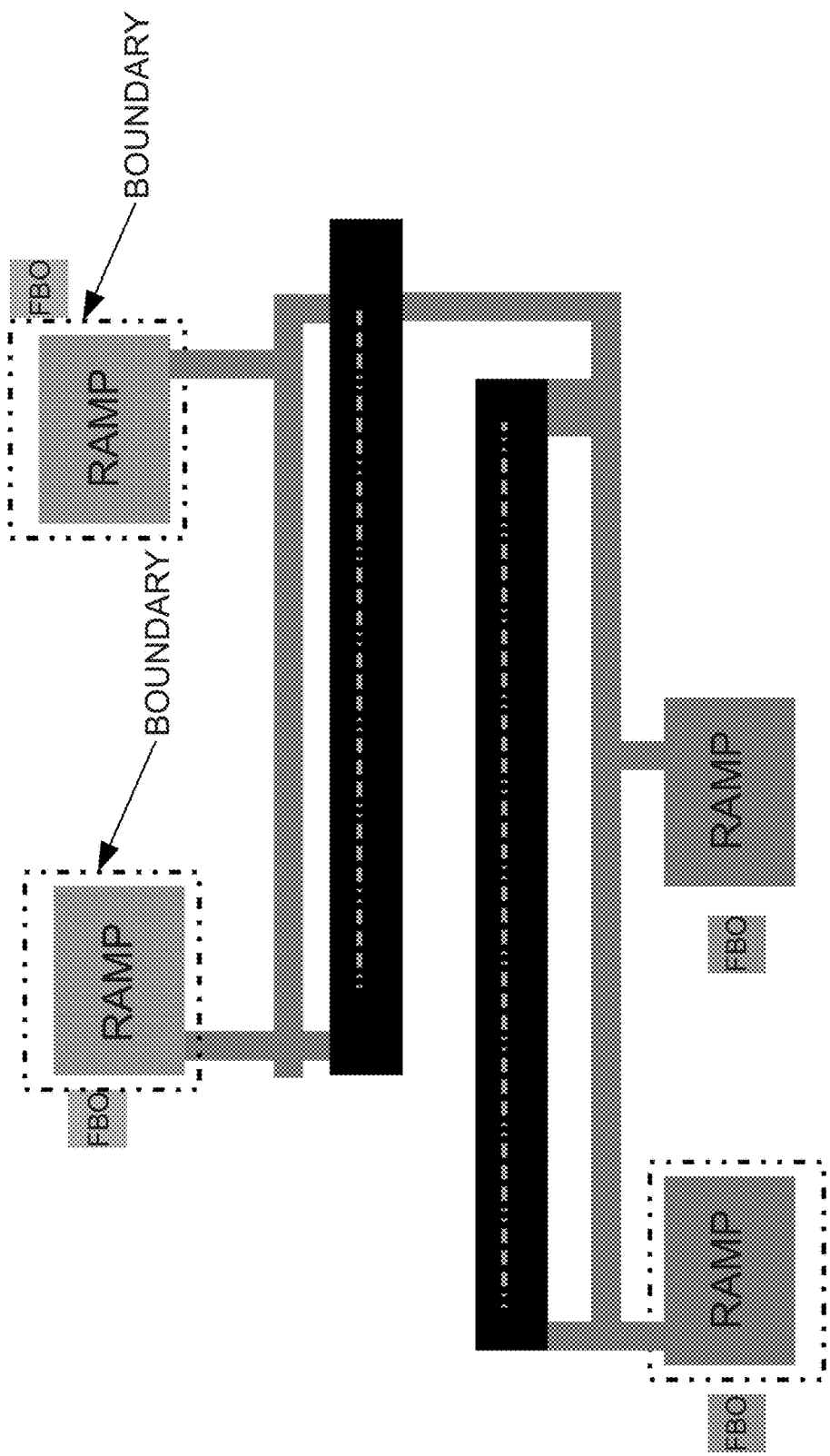
FIG. 3 AIRPORT DIAGRAM AND MORE THAN ONE BOUNDARY

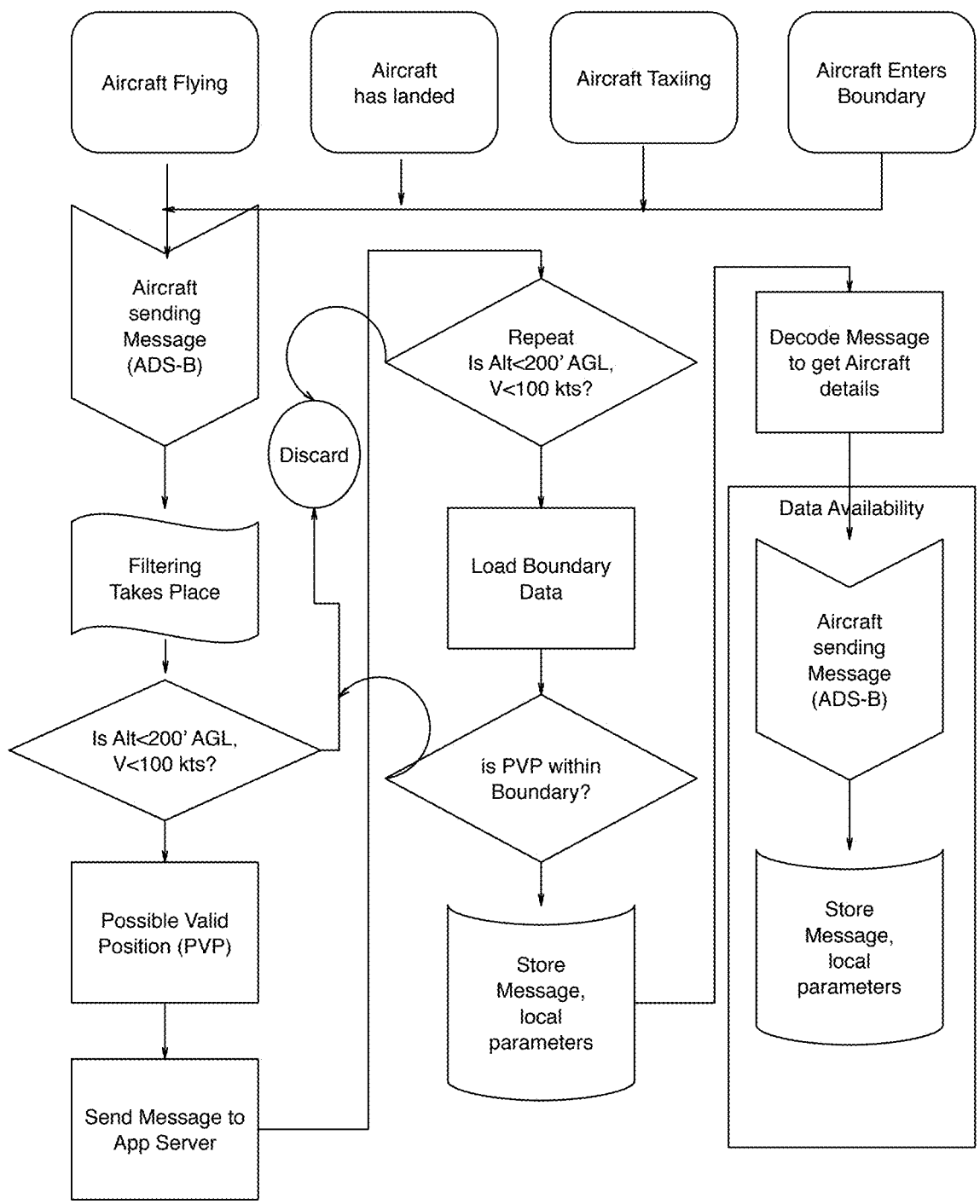
FIG.4 APPLICATION DETAILED FLOWCHART

METHOD AND SYSTEM TOOL FOR AIRCRAFT FACILITY ACCESS CAPTURE

RELATED APPLICATIONS

This application claims priority to U.S. Provisional Patent Application No. 62/995,997, filed on Feb. 24, 2020, which is incorporated herein by reference in its entirety, including any addendums, appendixes, and attachments thereto, to the extent this application does not conflict with the present disclosure herein.

BACKGROUND

Whether an aircraft has transited, parked, or departed the property at a Fixed Base Operator ("FBO") has historically been tracked and audited via FBO personnel or an aircraft pilot self-reporting. FBO personnel visually observe aircraft entering the property and manually enter information, including but not limited to, the aircraft tail number, date and time, make and model, and the weight of the aircraft to assess various fees applicable to the aircraft. Such fees may include, but are not limited to, government surcharges such as landing fees or private FBO use charges such as parking and hangar fees.

The Federal Aviation Administration has required the installation of "ADS-B" transmitters on all aircraft. The ADS-B transmitter provides a message string (the "Message") that can be captured via an ADS-B receiver. Multiple types of hardware devices are capable of acting as an ADS-B receiver. Data from the Message may be parsed for location, altitude, speed, and a unique International Civil Aviation Organization ("ICAO") identifier that further provide access to specific registration and aircraft details information.

The property at an FBO can be identified and marked using position coordinates such as latitude and longitude and this boundary can be referenced (the "Boundary"). Once the Boundary is known, the Message location data can be compared to determine whether the aircraft is located within the Boundary.

Often, personnel at an FBO may not be aware of a particular aircraft's presence within the Boundary and thus fees are not charged and revenues are lost.

Therefore, a need exists for a novel tool ("the Tool") to compare the Message and Boundary. One example of using the Tool would be an aircraft taxiing onto the facility FBO parking area to drop passengers and the Tool automatically recording the time the aircraft crossed the Boundary and then storing the arrival details in a database available to the personnel for review and download. Another example of using the Tool would be an aircraft entering the Boundary and staying within the Boundary for several days; the Tool making this data available for automatic access to calculate the number of days within the Boundary for purposes of determining overnight fees due. An additional example of using the Tool could also be used to place a Boundary around other locations at the same, or nearby airports, and monitor the aircraft crossing into these other Boundaries allowing this information use for marketing activities.

BRIEF SUMMARY OF THE INVENTION

The present invention is directed toward a Tool ("Tool") for integrating the concepts of aircraft ADS-B data messages (the "Messages"), facility boundary geographic information (the "Boundary"), time the aircraft is within the Boundary (the "Time Present", and possible fees into a single embodiment. The present invention comprises several programmable applications (collectively the "App") such as using the App in combination with the Message to determine the aircraft speed, aircraft altitude, and aircraft coordinates (collectively the "Aircraft Position") and the Boundary as well as other App parameters such as time of day, day of the week, aircraft make and model, aircraft ICAO identifier, aircraft FAA registry identifier, aircraft weight, and triggers loaded by facility personnel ("Rules"). Data may then be processed further by the App to calculate fees, send billings, or export to a third-party application (collectively "Data Availability").

BRIEF DESCRIPTION OF THE DRAWINGS

The present invention is illustrated by way of example, and not by way of limitation, in the figures of the accompanying drawings.

While aspects of the present invention will be described with reference to the details of the embodiments of the invention shown in the drawings (and some embodiments not shown in the drawings), these details are not intended to limit the scope of the invention.

FIG. 1. shows one possible example embodiment of the Tool describing a hypothetical airport with a Boundary.

FIG. 2. shows one possible example embodiment of the Tool illustrating an overview of the connections between the Local Device (see "A"), Filtering (see "B"), the App server (see "C"), Data Availability (see "D"), and Third party access to the data (see "E").

FIG. 3. shows one possible example embodiment of the Tool describing a hypothetical airport with more than one Boundary.

FIG. 4. shows one possible example embodiment of the Tool by way of a detailed flow chart illustrating, but not limited to, example relationships of the connections between the Message, the Aircraft Position, the Boundary, the Rules, and the Data Availability.

DETAILED DESCRIPTION

The following description is not to be taken in a limiting sense, but is made merely for the purpose of describing the general principles of exemplary embodiments; many additional embodiments of this invention are possible. It is understood that no limitation of the scope of the invention is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

The invention is described with such embodiments, but the invention is not limited to any embodiment. The scope of the invention is limited only by the claims and the invention encompasses numerous alternatives, modifications and equivalents. Several specific details are set forth in the following description to provide a thorough understanding of the invention. These details are provided for the purpose of example and the invention may be practiced according to the claims without some or all of these specific details. In general, the order of the steps of disclosed processes may be altered within the scope of the invention.

A component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Unless otherwise indicated, the drawings are intended to be read (e.g., arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. Also, as used herein, terms such as "positioned on" or "supported on" mean positioned or supported on but not necessarily in direct contact with the surface.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. The terms "a" or "an" entity refers to one or more of that entity. As such, the terms "a" (or "an"), "one or more" and "at least one" can be used interchangeably herein.

Further, the described features, structures, or characteristics of the present disclosure may be combined in any suitable manner in one or more embodiments. In the Detailed Description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure. Any alterations and further modifications in the illustrated devices, and such further application of the principles of the invention as illustrated herein are contemplated as would normally occur to one skilled in the art to which the invention relates.

The order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Specific typical examples of the hardware/software are as follows, not intended to be limiting: processor(s) are suitable chips such as those manufactured by Intel, AMD, IBM, AT&T, ARM v7 64-bit, etc. The chips may be 32 bit, 64 bit or any other type processor suitable for this application. Antennas and coaxial cable for 1090 MHz and 978 MHz reception are required to process the signals from the ADS-B receiver. Some versions of the tool may use a portable device like a Raspberry Pi, or any other similar computer. Suitable software code and/or computer code/instructions used for practicing the invention may be—iOS: Swift, Objective-C, C, C++——Android: Java, C++, JavaScript, Visual Studio, for example, or programmed in any language that can install to a computer processor device. The device needs sufficient data storage for the amount of data desired by any of the embodiments disclosed herein. The hardware can be made by any manufacturer whose specifications are compatible to the hardware/software requirements disclosed above as examples, not intended to be limiting.

For the purposes of promoting an understanding of the principles of the present invention, reference will now be made to the embodiments illustrated in the drawings and specific language will be used to describe the same, only as examples and not intended to be limiting.

A Tool (app tool, app software, app tool software are all used interchangeably herein to disclose the embodiments of the Tool) is disclosed using aircraft ADS-B message data, Messages, to determine the Aircraft Position and whether it is located within a Boundary for processing by the App on a computer, server, or other processor device.

In some embodiments of the present invention comprising a method for programming an App and implementing to receive ADS-B aircraft data, Messages, and using device based information to provide location, time of day, day of the week, or other input parameters, hereinafter referred to as the Local Device.

In some embodiments of the present invention, for example, not intended to be limiting, comprising a computer browser and user log in information is used to identify and configure an airport FBO location for interaction with the App, hereinafter referred to as the Client, for purposes of configuring the App.

In some embodiments of the present invention a graphical interface (GUI) may be presented for the user at the Client to generate data points for geographical locations of their choosing, referred to as the Boundary (see FIG. 1), based on the meaning of that location to the user, whether it be a location on an airport such as, but not limited to a parking area for dropping passengers, parking area for overnight aircraft parking, a taxiway defining a route to hangars, or an arbitrary location where there is a need to capture data regarding aircraft position. Such Boundary definitions may also include local information like elevation to support the requirements to determine Aircraft Position within three dimensions.

In some embodiments of the present invention a graphical user interface that allows the user to draw the Boundary with computer aided tools like a mouse, pen, touch screen, or other input device for purposes of defining the Boundary.

In some embodiments of the present invention there may be more than one Boundary (see FIG. 3).

In some embodiments of the present invention a graphical display that allows real-time operation of the system as well as map-based and textual information describing Aircraft Position detail and all associated parameters.

In some embodiments of the present invention the Local Device may perform calculations and run App algorithms on the Messages, parsing speed and altitude, to logically determine where the Aircraft Position is relative to the Boundary, hereinafter referred to as Filtering (see FIG. 2-B. FIG. 4).

In some embodiments of the present invention if the Filtering results in a valid Aircraft Position relative to the Boundary, hereinafter referred to as Possible Valid Position ("PVP"), the Message is then sent to the App server (see FIG. 2 and FIG. 4).

In some embodiments of the present invention the Filtering is implemented to reduce the number of PVP Messages sent to the app server.

In some embodiments of the present invention no Local Device is required and the App processes all messages as PVP Messages (see FIG. 2—optional Data sent from $3^{rd}$ party source).

In some embodiments of the present invention a graphical interface (GUI) is presented for the user at the Client to define Rules. These Rules trigger Aircraft Position information within the Boundary, for example, whether it be the minimum amount of time an aircraft should be within the Boundary. Time Present, before counting the aircraft and making Data Availability accessible (see FIG. 2 and FIG. 4).

In some embodiments of the present invention the Rules may be applicable to all Clients or available to only a single Client.

In some embodiments of the present invention, for example not intended to be limiting, data storage withing the App may be used to aggregate all of the Clients' data for purposes of building a database of information independent of third party aircraft information or taking the information from known sources.

In some embodiments of the present invention, for example not intended to be limiting, data storage withing the App may be used to connect to fee tables and send invoices, or charge known billing information (like a credit card on file as just one example) for certain fees.

In some embodiments of the present invention, Data Availability (see FIGS. 2-D and 2-E), for example, not intended to be limiting, a government entity, like a state government, may require a fee for an aircraft landing at the airport. Often times these fees are referred to as landing fees and personnel from, for example, the state government are required to collect said fees. Thus, in an example non-limiting embodiment, the Data Availability would automate the collection of these fees through connecting the aircraft information from the Message to databases with aircraft owner information and then automatically sending an invoice for fee collection.

In some embodiments of the present invention, the Data Availability described in the prior paragraph, for example, not intended to be limiting, may further contain a user portal to allow aircraft owners to provide their personal information in the App and further automate the state government fee collection process (See FIG. 2-F).

In some embodiments of the present invention, Data Availability (see FIGS. 2-D and E), for example, not intended to be limiting, the App may calculated the time within the boundary and use Rules and data stored based on the aircraft parameters to automatically calculate the fees due. These fees could then be sent (e.g. invoiced, billed out or another other appropriate accounting term) to the aircraft's responsible billing party. In the alternative, the fees could be sent to a known third party application used at a Fixed Base Operator or other entity responsible for the collection of the fees. Thus, in an example non-limiting embodiment, the Data Availability would automate the collection of these fees through connecting the aircraft information from the Message to databases with aircraft owner information and then automatically sending an invoice for fee collection.

In some embodiments of the present invention, the Data Availability described in the prior paragraph, for example, not intended to be limiting, may further contain a user portal to allow aircraft owners to provide their personal information in the App and further automate the fee collection process.

In some embodiments of the present invention some Boundaries may belong to competitors of the user of the app and Data Availability, for example but not meant to be limiting, is used to generate marketing information or for other competitive purposes.

In some embodiments of the present invention, the Data Availability described in the prior paragraph, for example, not intended to be limiting, may further contain a user portal to allow the Client to automate marketing emails, letters, and other Rule based functions that could include invitations, coupons, special offers, or text to raise awareness.

Versions of the invention concept may be a computer-implemented method of providing aircraft position information, comprising:
  receiving a definition of an Aircraft Position, the definition comprising an altitude and a geographical definition;
  storing a user-defined Boundary, the definition comprising an altitude and a geographical definition;
  determining if the Aircraft Position is within a Boundary; and
  presenting results to the user when Aircraft Positions are within the Boundary, a Possible Valid Position; and
  using the results presented to the user to compare to Rules; and
  presenting results to users and third-parties as Data Availability.

Other versions of the invention concept may be the computer-implemented method above, wherein the geolocation data is ADS-B data, sent via a third-party system, Global Positioning System (GPS) data, wireless base station connectivity data, cellular base station connectivity data, or wireless beacon connectivity data.

Other versions of the invention concept may be the computer-implemented method above, further comprising a Local Device: a computer; geolocation data; using the geolocation to determine if the Aircraft Position is within the Boundary, a Possible Valid Position; and presenting the Possible Valid Position of an Aircraft Position within the Boundary to a secondary computer processor.

Other versions of the invention concept may be the computer-implemented method above, wherein the Boundary definition is based on user data, and wherein the Boundary geographical definition comprises: a geographical boundary surrounding a geographic position defined by a user; and altitude or elevation data as defined by a user.

Other versions of the invention concept may be the computer-implemented method above, wherein defining the Boundary comprises: generating data points based on meaning to the user by geolocation data; and varying the elevation of the Boundary to have a floor and ceiling.

Other versions of the invention concept may be the computer-implemented method above, wherein creating the Boundary comprises a graphical user interface and multiple data points.

Other versions of the invention concept may be the computer-implemented method above, wherein the Possible Valid Position comprises: an Aircraft Position; and a Boundary; and comparing the Aircraft Position to the Boundary to determine if the Aircraft Position is within the Boundary.

Other versions of the invention concept may be the computer-implemented method above, wherein the Rules comprise: determining how long an Aircraft Position is within the Boundary; and using duration and Time Present within the Boundary; and presenting Aircraft Position data to the user when the Aircraft Position meets the Rule.

Other versions of the invention concept may be the computer-implemented method above, wherein Data Availability comprises: the automated distribution of the results to other applications; and the automated calculation of the results to determine costs and fees because the Aircraft Position is within the Boundary; and presenting a graphical user interface for users to interact with the results.

Other versions of the invention concept may be the computer-implemented method above further comprising: receiving a plurality of definitions of a plurality of places; determining that the Aircraft Position device is within a Boundary at least at one place of the plurality of places; presenting results to the user when Aircraft Positions are within the Boundary; using the results presented to the user to compare to Rules; presenting results to users and third-parties as Data Availability.

Other versions of the invention concept may be a non-transitory computer-readable medium with instructions stored thereon that, responsive to execution by a processing device, cause the processing device to perform operations comprising: receiving a definition of a Boundary, the definition comprising a place and a geographical definition; receiving a definition of an Aircraft Position; determining if the Aircraft Position is within a Boundary; presenting results to the user when Aircraft Positions are within the Boundary, a Possible Valid Position; using the results presented to the user to compare to Rules; presenting results to users and third-parties as Data Availability.

Other versions of the invention concept may be a system comprising: a memory with instructions stored thereon; and a processing device, coupled to the memory, the processing device configured to access the memory and execute the instructions, wherein the instructions cause the processing device to perform operations comprising: receiving a definition of a Boundary, the definition comprising a place and a geographical definition; receiving a definition of an Aircraft Position; determining if the Aircraft Position is within a Boundary; presenting results to the user when Aircraft Positions are within the Boundary, a Possible Valid Position; using the results presented to the user to compare to Rules; presenting results to users and third-parties as Data Availability.

The embodiments of the present invention may be utilized individually, concurrently, or in any sequential combination.

Those skilled in the art to which this application relates will appreciate that other and further additions, deletions, substitutions, and modifications may be made to the described embodiments.

We claim:

1. A method of providing aircraft position information within a Boundary at an airport, comprising:
   receiving, by a local device comprising a computer, an antenna, and cabling connecting the antenna to the computer, a definition of an Aircraft Position from ADS-B message data of an aircraft from at least one of a third-party system, a Global Positioning System (GPS), a wireless base station, a cellular base station, and wireless beacon, the definition comprising an altitude and a geographical definition;
   receiving, by the local device, a user-defined Boundary having a geographic outline and altitude floor and ceiling, and storing Boundary data;
   determining, by the local device, the aircraft position relative to the user-defined boundary based on the ADS-B message data and the user-defined Boundary data, whether the Aircraft Position is within the user-defined Boundary, wherein the determining comprises processing the ADS-B message data and the user-defined Boundary data and filtering an output of the processing to provide a Possible Valid Position;
   wherein the processing and filtering comprise applying data processing algorithms to handle real-time ADS-B data transmitted at standardized rates comprising messages transmitted at a rate of 0.2 to 15 seconds;
   presenting, via a user interface, results as Possible Valid Positions to a user when Aircraft Positions are within the user-defined Boundary;
   comparing, by a processing device, the results presented to the user to Rules stored on an application server, wherein the comparing comprises:
      determining how long an Aircraft Position is within the Boundary; presenting, via the user interface, Aircraft Position data to the user when a time duration of the Aircraft Position within the Boundary meets a Rule; and
      presenting, via the user interface, the results to users and third parties as Data Availability, wherein the user interface provides functionality for real-time interaction with and visualization of aircraft positions relative to user-defined boundaries.

2. The method of claim 1, wherein the user-defined Boundary definition is based on user data comprising:
   a geographical boundary surrounding a geographic position defined by the user.

3. The method of claim 1, wherein defining the user-defined Boundary comprises:
   receiving, via a graphical user interface, user input drawing the user-defined Boundary:
   generating data points corresponding to user-selected geolocation data; receiving user input varying an elevation of the user-defined Boundary to define an altitude floor and an altitude ceiling.

4. The method of claim 1, wherein the Possible Valid Position comprises:
   the Aircraft Position; and
   the user-defined Boundary; and
   comparing the Aircraft Position to the user-defined Boundary to determine if the Aircraft Position is within the user-defined Boundary; and
   filtering an output of based on the comparison.

5. The method of claim 1, wherein Data Availability comprises:
   the automated distribution of the results to other applications; and
   the automated calculation of the results to determine costs and fees because the Aircraft Position is within the user-defined Boundary; and
   presenting a graphical user interface for users to interact with the results.

6. The method of claim 1, further comprising:
   receiving a plurality of definitions of a plurality of places;
   determining that the Aircraft Position is within a user-defined Boundary at least at one place of the plurality of places;
   processing and filtering an output of the determination to provide a Possible Valid Position;
   presenting results to the user when Aircraft Positions are within the user-defined Boundary; and
   using the results presented to the user to compare to Rules; and presenting results to
   users and third-parties as Data Availability.

7. A non-transitory computer-readable medium with instructions stored thereon that, responsive to execution by a processing device, cause the processing device to perform operations comprising:

receiving a user-defined Boundary from a local device and storing the same as user-defined Boundary data, the user-defined Boundary data having a geographic outline and an altitude floor and ceiling;

receiving, by a local device comprising a computer, an antenna, and cabling connecting the antenna to the computer, a definition of an Aircraft Position from ADS-B message data of an aircraft from at least one of a third-party system, a Global Positioning System (GPS), a wireless base station, a cellular base station, and wireless beacon, the definition comprising an altitude and a geographic definition;

determining, by the local device, the aircraft position relative to the user-defined Boundary, based on the ADS-B message data and the user-defined Boundary data, whether the Aircraft Position is within the user-defined Boundary, wherein the determining comprises processing the ADS-B message data and the user-defined Boundary data and filtering an output of the processing to provide a Possible Valid Position;

wherein the processing and filtering comprise applying data processing algorithms to handle real-time ADS-B data transmitted at standardized rates comprising messages transmitted at a rate of 0.2 to 15 seconds;

presenting, via a user interface, results as Possible Valid Positions to a user when Aircraft Positions are within the user-defined Boundary;

comparing, via the processing device, the results presented to the user to Rules stored on an application server; wherein the comparing comprises:

determining how long an Aircraft Position is within the Boundary;

presenting, via the user interface, Aircraft Position data to the user when a time duration of the Aircraft Position within the Boundary meets a Rule; and presenting, via the user interface, the results to users and third parties as Data Availability, wherein the user interface provides functionality for real-time interaction with and visualization of aircraft positions relative to user-defined boundaries.

8. A system comprising:

a memory with instructions stored thereon; and a processing device, coupled to the memory, the processing device configured to access the memory and execute the instructions, wherein the instructions cause the processing device to perform operations comprising:

receiving a user-defined Boundary from a local device and storing the same as user-defined Boundary data, the user-defined Boundary data having a geographic outline and an altitude floor and ceiling;

receiving, by a local device comprising a computer, an antenna, and cabling connecting the antenna to the computer, a definition of an Aircraft Position from ADS-B message data of an aircraft from at least one of a third-party system, a Global Positioning System (GPS), a wireless base station, a cellular base station, and wireless beacon, the definition comprising an altitude and a geographic definition;

determining, by the local device, the aircraft position relative to the user-defined Boundary, based on the ADS-B message data and the user-defined Boundary data, whether the Aircraft Position is within the user-defined Boundary, wherein the determining comprises processing the ADS-B message data and the user-defined Boundary data and filtering an output of the processing to provide a Possible Valid Position;

wherein the processing and filtering comprise applying data processing algorithms to handle real-time ADS-B data transmitted at standardized rates comprising messages transmitted at a rate of 0.2 to 15 seconds;

presenting, via a user interface, results as Possible Valid Positions to a user when Aircraft Positions are within the user-defined Boundary;

comparing, via the processing device, the results presented to the user to Rules stored on an application server; wherein the comparing comprises:

determining how long an Aircraft Position is within the Boundary; presenting, via the user interface, Aircraft Position data to the user when a time duration of the Aircraft Position within the Boundary meets a Rule; and presenting, via the user interface, the results to users and third parties as Data Availability, wherein the user interface provides functionality for real-time interaction with and visualization of aircraft positions relative to user-defined boundaries.

9. The method of claim 1, wherein the Data Availability further comprises: calculating, by the processing device, fees based on the time duration of the Aircraft Position within the Boundary and aircraft-specific parameters; and automatically generating and transmitting invoices for the calculated fees.

10. The system of claim 8, wherein the Data Availability further comprises: calculating, by the processing device, fees based on the time duration of the Aircraft Position within the Boundary and aircraft-specific parameters; and automatically generating and transmitting invoices for the calculated fees.

11. The method of claim 1, wherein the standardized rates comprise: airborne position messages transmitted at a rate of 0.4 to 0.6 seconds; surface position messages transmitted at a rate of 0.4 to 0.6 seconds when moving and 4.8 to 5.2 seconds when stationary; aircraft status messages transmitted at a rate of 0.7 to 0.9 seconds during status changes and 4.8 to 5.2 seconds during normal operation; and operational status messages transmitted at a rate of 2.4 to 2.6 seconds.

12. The method of claim 1, wherein the standardized rates further comprise: aircraft identification and category messages transmitted at a rate of 4.8 to 5.2 seconds when moving and 9.8 to 10.2 seconds when stationary; target state and status messages transmitted at a rate of 1.2 to 1.3 seconds; and aircraft operational status messages transmitted at a rate of 2.4 to 2.6 seconds.

* * * * *